(12) United States Patent
Varghese

(10) Patent No.: US 11,619,155 B2
(45) Date of Patent: Apr. 4, 2023

(54) METAL CATALYTIC CONVERTER SYSTEM FOR AUXILIARY POWER UNIT AND AUTOMOBILE ENGINE EXHAUSTS

(71) Applicant: The Boeing Company, Chicago, IL (US)

(72) Inventor: Sijo Varghese, Chennai (IN)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/575,445

(22) Filed: Jan. 13, 2022

(65) Prior Publication Data

US 2022/0243627 A1   Aug. 4, 2022

Related U.S. Application Data

(60) Provisional application No. 63/145,335, filed on Feb. 3, 2021.

(51) Int. Cl.
*F01N 3/20* (2006.01)
*F02C 3/00* (2006.01)

(52) U.S. Cl.
CPC ............. *F01N 3/20* (2013.01); *F02C 3/00* (2013.01); *F05D 2220/32* (2013.01)

(58) Field of Classification Search
CPC ...... F01N 3/20; F02C 3/00; F02C 6/00; F02C 6/06; F02C 9/16; F05D 2220/32; F05D 2220/50; F05D 2270/08; F05D 2270/0831
See application file for complete search history.

(56) References Cited

U.S. PATENT DOCUMENTS

| | | | |
|---|---|---|---|
| 6,029,441 A * | 2/2000 | Mizuno | F01N 3/0871 60/276 |
| 6,298,654 B1 * | 10/2001 | Vermes | F23C 9/00 60/774 |
| 6,725,651 B2 * | 4/2004 | Itoh | B01D 53/9495 60/276 |
| 9,752,458 B2 * | 9/2017 | Huntington | F02C 6/00 |
| 9,903,271 B2 * | 2/2018 | Oelfke | F02C 7/08 |
| 9,932,874 B2 * | 4/2018 | Beutel | F01N 3/0864 |
| 9,938,861 B2 * | 4/2018 | Huntington | F01K 23/10 |
| 10,082,063 B2 * | 9/2018 | Beutel | F02C 3/34 |
| 10,544,728 B2 * | 1/2020 | Zhang | F02B 37/10 |
| 10,934,894 B2 * | 3/2021 | Copeland | F01K 21/045 |
| 2020/0263568 A1 * | 8/2020 | Copeland | F02C 6/04 |

* cited by examiner

*Primary Examiner* — Jesse S Bogue
(74) *Attorney, Agent, or Firm* — Felix L. Fischer

(57) ABSTRACT

A metal catalytic converter system employs an engine having an exhaust duct. A multistage metal catalytic converter is mounted in the exhaust duct. A compressor stage is mounted in the exhaust duct, the compressor stage configured to reduce exhaust backpressure created by the converter.

21 Claims, 5 Drawing Sheets

METAL CATALYTIC CONVERTER SYSTEM FOR AUXILIARY POWER UNIT AND AUTOMOBILE ENGINE EXHAUSTS

REFERENCE TO RELATED APPLICATIONS

This application claims priority of U.S. provisional application Ser. No. 63/145,335 filed on Feb. 3, 2021 entitled AN IMPROVED METAL CATALYTIC CONVERTER SYSTEM FOR AUXILIARY POWER UNIT AND AUTOMOBILE ENGINE EXHAUSTS having a common assignee with the present application, the disclosure of which is incorporated herein by reference.

BACKGROUND

Field

The present disclosure relates to systems for emissions reduction in Auxiliary Power Units (APU) and automobile exhausts. More particularly, the present disclosure is directed to a multiple stage catalytic converter mounted in an exhaust stream with a compressor downstream of the converter to compensate for back pressure in the exhaust created by the converter.

Related Art

Aircraft may include an auxiliary power unit (APU), which serves as an additional energy source for starting a main engine or for supplemental electrical energy supply. The APU may provide the power required to operate onboard lighting, galley electrics, environmental control systems, and cockpit avionics while the aircraft is parked at the gate. The APU typically employs a gas turbine engine and a load compressor mounted in a compartment located within the tail cone of the aircraft. Current APUs typically do not provide emissions control for exhaust gas from the gas turbine engine. However, emissions reduction requirements for aircraft operation may require APU emissions control.

Automotive and other reciprocating engines typically provide exhaust emissions control and employ a catalytic converter for reducing certain noxious pollutant emissions. However, efficacy and efficiency of the catalytic converter may not be optimum. Available metal catalytic converters in the market typically employ noble metals but do not have the capability to control carbon monoxide produced by the fuel combustion. Carbon monoxide along with excess hydrocarbons are then oxidized to form carbon dioxide which goes into the atmosphere. Existing catalytic converters increase the back pressure in the exhaust in automotive engines which increases fuel consumption and exhaust system temperatures.

It is therefore desirable to provide a catalytic converter system employable in both APU and automobile applications which overcomes the shortcomings of the prior art for optimum operation.

SUMMARY

The implementations disclosed herein provide a metal catalytic converter system for an engine having an exhaust duct. A multistage metal catalytic converter is mounted in the exhaust duct. A compressor stage is mounted in the exhaust duct, the compressor stage configured to reduce exhaust backpressure created by the converter.

The disclosed implementations provide a method for emissions reduction in an engine. A compressor stage is mounted in an exhaust duct downstream of a metal catalytic converter. The compressor stage is driven with a compressor shaft. Speed of the compressor shaft is selected to optimize or compensate for exhaust backpressure created by the metal catalytic converter.

The features, functions, and advantages that have been discussed may be achieved independently in various implementations or may be combined in other implementations further details of which can be seen with reference to the following description and drawings.

BRIEF DESCRIPTION OF THE DRAWINGS

The drawings described herein are for illustration purposes only and are not intended to limit the scope of the present disclosure.

DETAILED DESCRIPTION

The present disclosure demonstrates example implementations of an improved metal catalytic converter system, for exhaust from auxiliary power units and automobile engines. A multistage metal catalytic converter is mounted in an exhaust duct in conjunction with a compressor stage also mounted in the exhaust duct to reduce exhaust backpressure created by the converter. For engines having a power shaft accessible from the exhaust duct, such as a gas turbine employed in an APU, the power shaft extends through a multistage metal catalytic converter in the exhaust duct and provides rotational power for a compressor stage mounted in the exhaust duct downstream of the converter. A concentric drive shaft rotational speed modification unit may be employed to adjust rotational speed of the attached compressor stage for desired pressure matching. In engine configurations having a curved exhaust duct, one or more universal joints in the drive shaft may be employed to align the shaft through the converter and position the compressor stage in the exhaust duct.

For use with reciprocating engines having open exhaust systems not easily accessible to a power shaft, rotational power for the compressor stage is provided by an electric motor. Speed control of the electric motor may be accomplished with a controller receiving input from exhaust pressure sensors, located upstream and downstream of the metal catalytic converter, calibrated to determine backpressure created by the metal catalytic converter. The electric motor may be internal to the exhaust duct or external to the duct employing a gear box, drive shaft or other power transmission mechanism to the compressor stage.

The multistage metal catalytic converter may employ three stages for carbon monoxide (CO) adsorption, nitrous oxide (NOx) reduction and oxidizing of excess hydrocarbons (HC) in the exhaust. An alternative five stage metal catalytic converter may employ a first stage for CO adsorption, a second stage for initial NOx and carbon dioxide ($CO_2$) reduction, a third stage for excess HC oxidation, a fourth stage for additional NOx and $CO_2$ reduction and a final stage for further CO adsorption.

Figure 1:
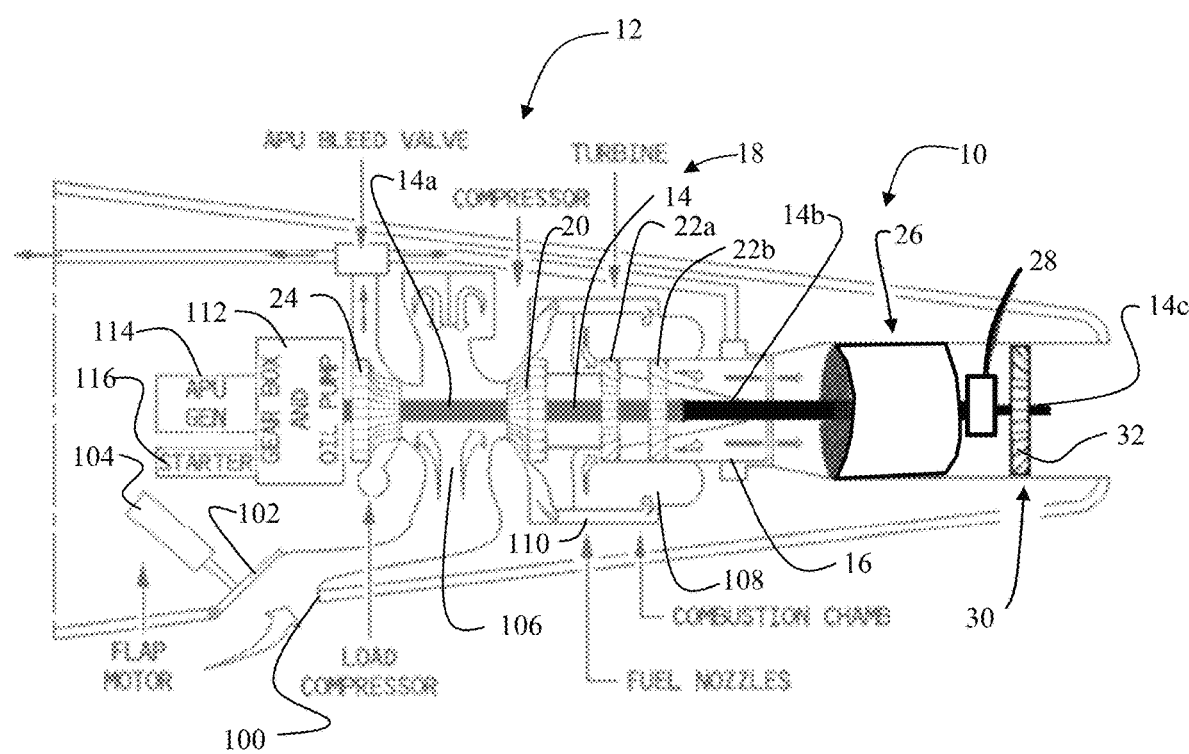
FIG. 1 is a representation of an APU having an axially aligned power shaft and exhaust duct with an example implementation of an improved metal catalytic converter system employed.

Referring to the drawings, FIG. 1 shows an example implementation of a metal catalytic converter system 10 in an APU 12 having a drive shaft 14 axially aligned with an exhaust duct 16. The APU 12 has a gas turbine engine 18 with a compressor 20 and multiple turbine stages 22a, 22b mounted to the drive shaft 14. In the example, the compressor 20 is a radial compressor and the turbine stages 22a, 22b are axial turbines. In alternative implementations, the compressor may be a single or multiple stage axial compressor or the turbine stages may be a radial turbine. The gas turbine engine 18 operates in a conventional fashion with working air received through an inlet 100 (which in the example implementation has a door 102 operated by a flap motor 104). The working air received in an inlet plenum 106 is separated into a combustion air stream received through the compressor 20 and working air stream received in a load compressor 24. Compressed air exiting the compressor is heated in a combustion chamber 108 fed with fuel through fuel nozzles 110. The heated air is then expanded through the turbine stages 22a, 22b and exhausted into the exhaust duct 16.

The drive shaft 14 has multiple sections and extends forward from the gas turbine engine 18 with a load shaft 14a driving the load compressor 24 (shown in the example as a radial compressor) to provide the functional capabilities of the APU 12. A separated portion of the working air in the inlet plenum 106 is compressed in the load compressor 24 for use as bleed air and compressed air in the APU function. The load shaft additionally powers a gear box 112 driving a generator 114. A starter 116 engaged through the gear box 112 provides starting rotation of the drive shaft 14.

The drive shaft also extends aft of the gas turbine engine 18 with an auxiliary shaft 14b. The auxiliary shaft 14b extends concentrically through a metal catalytic converter 26 mounted in the exhaust duct 16. In the example implementation, the auxiliary shaft connects through a concentric rotational speed modification unit 28 driving a compressor shaft 14c. A compressor stage 30 is connected to the compressor shaft 14c and rotationally driven by the compressor shaft. In the example implementation, the compressor stage 30 is a single stage axial compressor. In alternative implementations, the compressor stage may employ multiple axial stages or a radial compressor.

The rotational speed modification unit 28 controls speed of the compressor shaft 14c to optimize pressure differential created by the compressor stage 30 to neutralize backpressure in the exhaust duct 16 created by the metal catalytic converter 26. In exemplary implementations a cup or pancake gear set employing a rigid circular spline engaged to a flexible spine by an elliptical rotor is used. In alternative implementations, the compressor stage 30 may employ controllable pitch compressor blades 32 to aerodynamically alter pressure differential created by the compressor stage 30 in the exhaust duct 16 to eliminate or supplement the rotational speed modification unit 28.

Figure 2:
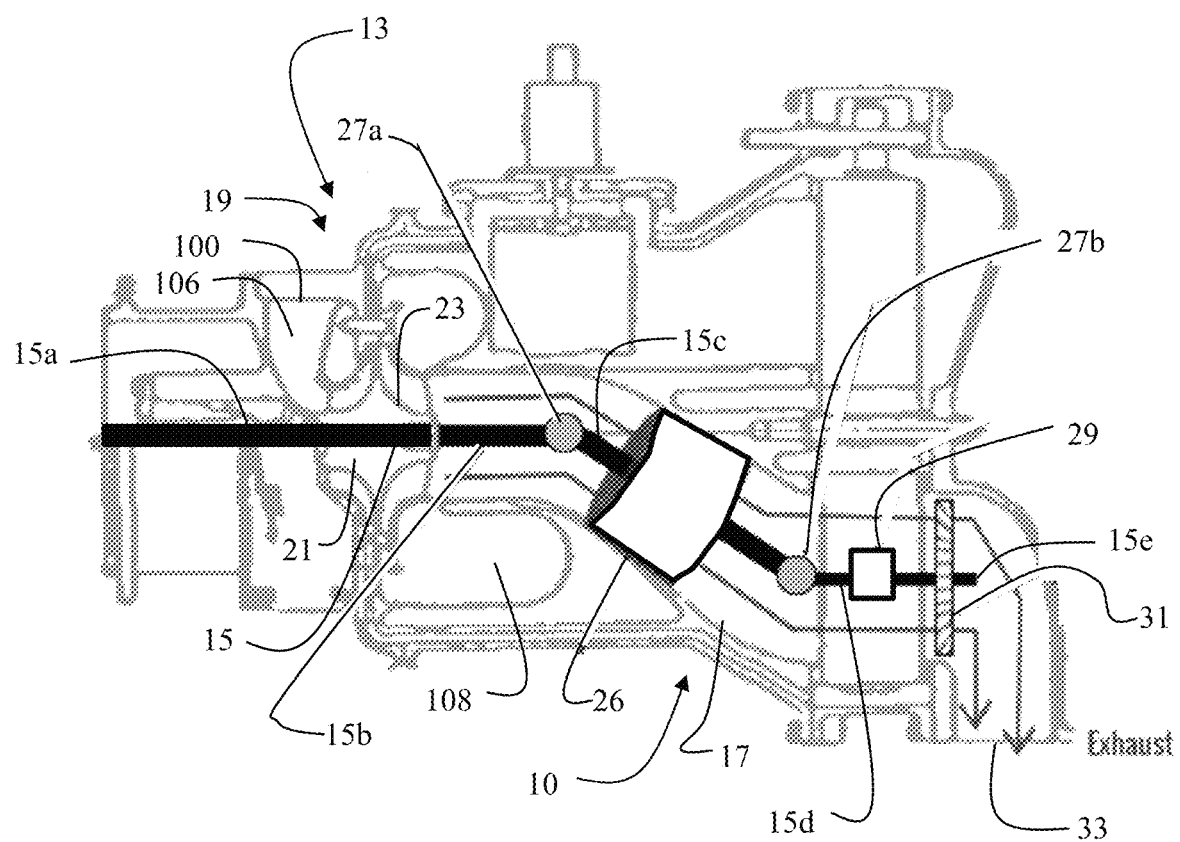
FIG. 2 is a representation of an APU having a curved exhaust duct not in planar alignment with the power shaft with an alternative example implementation of an improved metal catalytic converter system employed.

An implementation of the metal catalytic converter system 10 in an APU 13 having a curved exhaust duct 17 is shown in FIG. 2. The APU 13 has a gas turbine engine 19 with a compressor 21 and a turbine 23 mounted to a drive shaft 15. In the example, the compressor 21 is a radial compressor and the turbine 23 is a radial flow turbine. The gas turbine engine 19 operates in a conventional fashion with working air received through an inlet 100. The working air received in an inlet plenum 106 is received through the compressor 21. Compressed air exiting the compressor is heated in a combustion chamber 108. The heated air is then expanded through the turbine 23 and exhausted into the exhaust duct 17. Details of the operational elements attached to the forward load shaft 15a are not shown. The drive shaft 15 extends aft of the gas turbine engine 19 with a segmented auxiliary shaft 15b, 15c, 15d. The auxiliary shaft first segment 15b extends to a first universal joint 27a and a second segment 15c extends from the first universal joint 27a, concentrically through a metal catalytic converter 26 mounted in the exhaust duct 17, to a second universal joint 27b. A third segment 15d extends aft from the second universal joint 27b. In the example implementation, the third segment 15d connects through a concentric rotational speed modification unit 29 driving a compressor shaft 15e. A compressor stage 31 is mounted to the compressor shaft 15e and rotationally driven by the compressor shaft. In the example implementation, the compressor stage 31 is a single stage axial compressor. In alternative implementations, the compressor stage may employ multiple axial stages or a radial compressor. The exhaust duct 17 is an S-shaped curve and the segments of the auxiliary shaft and universal joints maintain the auxiliary shaft in substantially concentric alignment within the exhaust duct. The exhaust duct 17 vents laterally downward through an exhaust port 33 for the example implementation.

Figure 3:
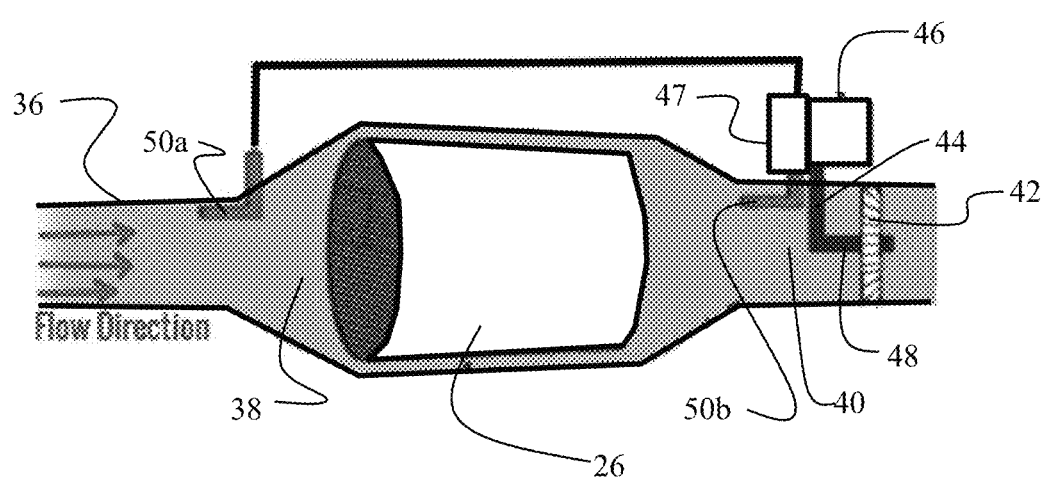
FIG. 3 is representation of an additional alternative exemplary implementation of an improved metal catalytic converter system with an independently powered compressor.

An example implementation for engines without an easily accessible drive shaft (including APUs or other gas turbine engine implementations with complex exhaust duct curvatures not readily amendable to direct drive shaft access) is shown in FIG. 3. An exhaust duct 36 receives exhaust from an engine (not shown) and includes an expansion into an exhaust plenum 38. A metal catalytic converter 26 is mounted in the exhaust plenum 38. An exhaust outlet 40 extends as a part of the exhaust duct 36 from the exhaust plenum 38 to vent exhaust to the atmosphere. A compressor stage 42 is mounted in the exhaust duct 36 in the exhaust outlet 40 and driven through a drive shaft 44 by an electric motor 46. A compressor shaft 48 extends from the drive shaft and a universal joint or other comparable connection may be employed. Rotational speed of the motor is controlled by a motor controller 47 connected to received inputs from a first pressure transducer 50a, mounted in either the exhaust duct 36 or exhaust plenum 38 to measure pressure upstream of the metal catalytic converter 26, and a second pressure transducer 50b, mounted either the exhaust plenum 38 or exhaust outlet 40 to measure pressure downstream of the metal catalytic converter 26. Motor controller 47 adjusts speed of the electric motor 46 and compressor stage 42 to optimize or neutralize exhaust backpressure created by the metal catalytic converter. While shown in the example implementation as mounted external to the exhaust outlet 40, the electric motor 46 may be mounted within the exhaust duct with appropriate shielding or insulation.

Figure 4:
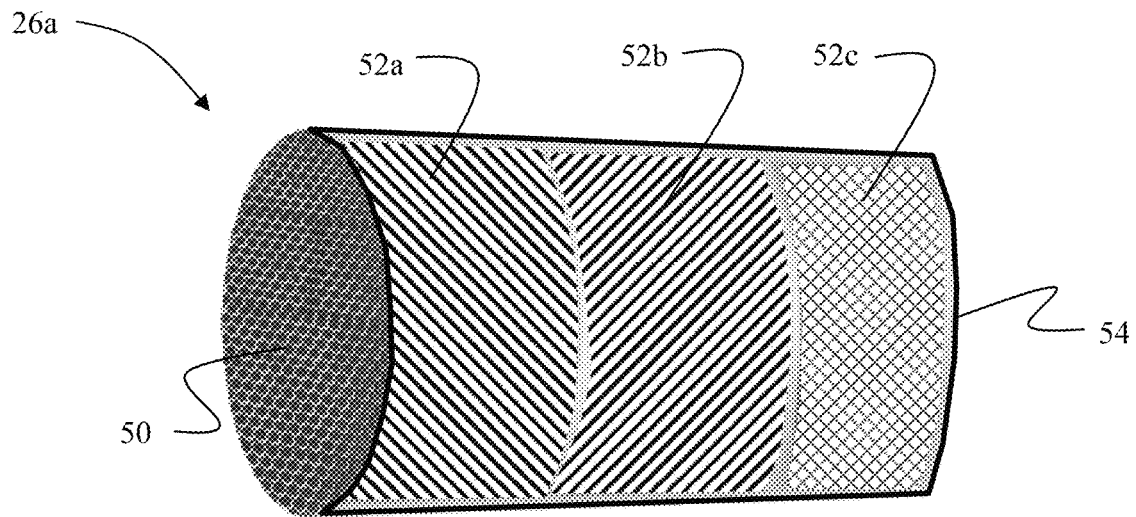
FIG. 4 is a detailed representation a first configuration of a three stage metal catalytic converter employed in the example implementations.
Figure 5:
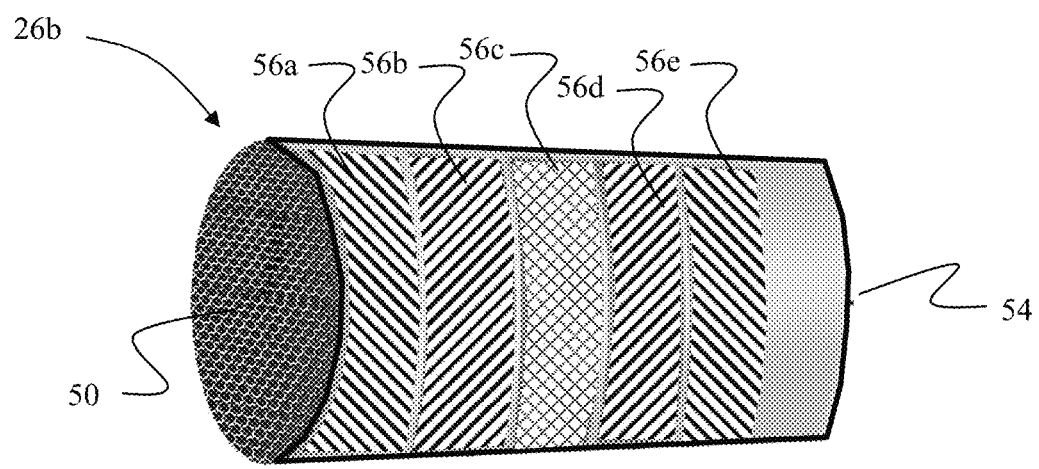
FIG. 5 s a detailed representation a first configuration of a five stage metal catalytic converter employed in the example implementations; and, FIG. 6 illustrates a method for exhaust emissions reduction employing the disclosed implementations.

In the example implementations, the metal catalytic converter 26 may be a three stage converter 26a as shown in FIG. 4 or a five stage converter 26b as shown in FIG. 5. The three stage converter 26a has an inlet 50 receiving exhaust gas from the engine and includes a first stage 52a adjacent to the inlet fabricated from a transition metal such as tungsten to adsorb carbon monoxide (CO). A second stage 52b, downstream from the first stage 52a, is fabricated from a Noble metal such as Rhodium, which may be supplemented with platinum, to reduce NOx. A third stage 52c, downstream from the second stage 52b, is fabricated from a second Noble metal such as Palladium, which also may be supplemented with platinum, to oxidize excess hydrocarbons (HC) to $H_2O$ and $CO_2$. Exhaust at an outlet 54 of the three stage converter 26a has significantly reduced emissions.

The five stage converter 26b has an inlet 50 receiving exhaust gas from the engine and includes a first stage 56a adjacent to the inlet fabricated from a transition metal such as tungsten to adsorb carbon monoxide (CO). A second stage 56b, downstream from the first stage 52a, is fabricated from a Noble metal such as Rhodium, which may be supplemented with platinum, to reduce NOx. A third stage 56c, downstream from the second stage 52b, is fabricated from a second Noble metal such as Palladium, which also may be supplemented with platinum, to oxidize excess hydrocarbons (HC) to $H_2O$ and $CO_2$. A fourth stage 56d, downstream from the third stage 52c, is fabricated from a Noble metal such as Rhodium, which may be supplemented with platinum, to further reduce NOx and $CO_2$ and a fifth stage 56e downstream of the fourth stage 56d is fabricated from a transition metal such as tungsten to further adsorb CO. Exhaust at an outlet 54 of the five stage converter 26b has significantly reduced emissions with substantially zero $CO_2$ emission.

Figure 6:
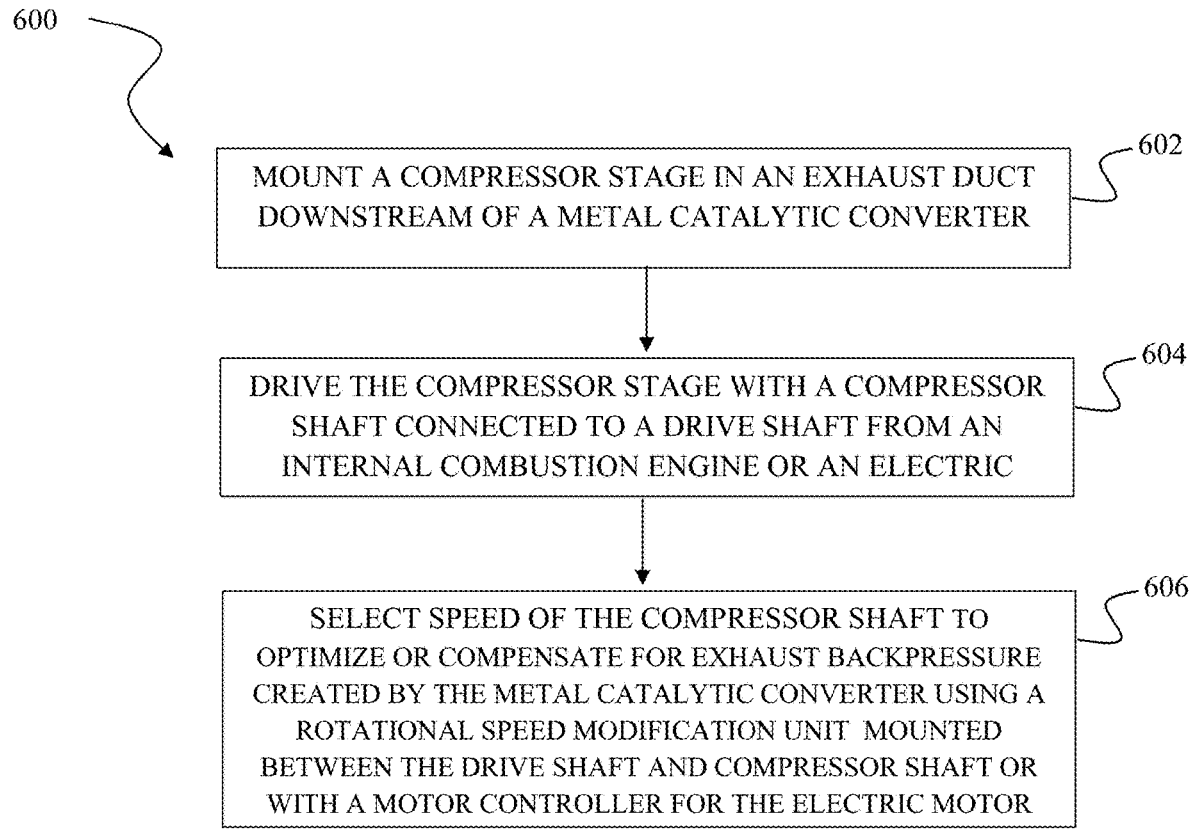

FIG. 6 demonstrates a method 600 for emissions reductions from an APU or reciprocating engine. A compressor stage mounted in an exhaust duct downstream of a metal catalytic converter, step 602 and driven by a compressor shaft, step 604. In certain implementations the compressor shaft is connected to a drive shaft which extends from an internal combustion engine with the exhaust duct receiving exhaust from the engine. In alternative implementations the compressor shaft is connected to or extends from an electric motor. Rotational speed of the compressor shaft is selected to optimize or compensate for exhaust backpressure created by the metal catalytic converter, step 606. Speed selection may be accomplished with the drive shaft employing a concentric rotational speed modification unit connected between the drive shaft and compressor shaft. In an electric motor driven configuration, speed selection is accomplished by a motor controller receiving inputs from pressure sensors upstream and downstream of the metal catalytic converter, the motor controller configured to control speed of the motor to optimize or neutralize exhaust backpressure created by the metal catalytic converter.

Having now described various implementations in detail as required by the patent statutes, those skilled in the art will recognize modifications and substitutions to the specific implementations disclosed herein. Such modifications are within the scope and intent of the following claims. Within the specification and the claims, the terms "comprising", "incorporate", "incorporates" or "incorporating", "include", "includes" or "including", "has", "have" or "having", and "contain", "contains" or "containing" are intended to be open recitations and additional or equivalent elements may be present. As used herein the terms "upper" and "lower", "left" and "right", "longitudinal" and "lateral", "forward" and "aft" are employed to describe relative positioning and other than for the specific implementations disclosed may be substituted with appropriate descriptors such as "first" and "second", "top" and "bottom" or "right" and "left" depending on orientation of actual implementation.

What is claimed is:

1. A metal catalytic converter system comprising:
    an engine having
        an exhaust duct, and
        a drive shaft accessible from the exhaust duct;
    a multistage metal catalytic converter mounted in the exhaust duct; and
    a compressor stage mounted in the exhaust duct, said compressor stage configured to reduce exhaust backpressure created by the multistage metal catalytic converter, the drive shaft extending through the multistage metal catalytic converter and connected to provide rotational power to the compressor stage.

2. The metal catalytic converter system as defined in claim 1 wherein the compressor stage is mounted in the exhaust duct downstream of the multistage metal catalytic converter.

3. The metal catalytic converter system as defined in claim 2 wherein the engine comprises a gas turbine employed in an APU.

4. The metal catalytic converter system as defined in claim 2 further comprising a concentric drive shaft rotational speed modification unit configured to adjust rotational speed of the connected compressor stage for desired pressure matching.

5. The metal catalytic converter system as defined in claim 2 wherein the exhaust duct is curved and further comprising one or more universal joints in the drive shaft align the drive shaft through the multistage metal catalytic converter and position the compressor stage in the exhaust duct.

6. The metal catalytic converter system as defined in claim 1 wherein the multistage metal catalytic converter comprises at least three stages.

7. The metal catalytic converter system as defined in claim 6 wherein the multistage metal catalytic converter comprises:
    an inlet receiving exhaust gas from the engine;
    a first stage adjacent to the inlet fabricated from a transition metal to adsorb carbon monoxide (CO);
    a second stage downstream from the first stage fabricated from a Noble metal to reduce NOx and $CO_2$; and
    a third stage downstream from the second stage fabricated from a second Noble metal to oxidize excess hydrocarbons (HC).

8. The metal catalytic converter system as defined in claim 7 wherein the transition metal comprises Tungsten.

9. The metal catalytic converter system as defined in claim 7 wherein the Noble metal comprises Rhodium.

10. The metal catalytic converter system as defined in claim 7 wherein the second Noble metal comprises Palladium.

11. The metal catalytic converter system as defined in claim 9 wherein the Rhodium is supplemented with platinum.

12. The metal catalytic converter system as defined in claim 10 wherein the Palladium is supplemented with platinum.

13. The metal catalytic converter system as defined in claim 6 wherein the multistage metal catalytic converter comprises a five stage converter.

14. The metal catalytic converter system as defined in claim 13 wherein the multistage metal catalytic converter comprises:
    an inlet receiving exhaust gas from the engine;

a first stage adjacent to the inlet fabricated from a transition metal to adsorb carbon monoxide (CO);

a second stage downstream from the first stage fabricated from a first Noble metal to reduce NOx and $CO_2$;

a third stage downstream from the second stage fabricated from a second Noble metal to oxidize excess hydrocarbons (HC);

a fourth stage downstream from the third stage fabricated from the first Noble metal to further reduce NOx and $CO_2$; and a fifth stage downstream of the fourth stage fabricated from the transition metal to further adsorb CO.

15. The metal catalytic converter system as defined in claim 14 wherein the transition metal is Tungsten, the first Noble metal is Rhodium and the second Noble metal is Palladium.

16. The metal catalytic converter system as defined in claim 15 wherein the first and second Noble metals are supplemented with platinum.

17. A method for emissions reduction in an engine comprising:

mounting a compressor stage in an exhaust duct downstream of a multistage metal catalytic converter, said compressor stage configured to reduce exhaust backpressure created by the multistage metal catalytic converter;

connecting a drive shaft which extends from the internal combustion engine to the compressor stage extending through the multistage metal catalytic converter and connected to provide rotational power to the compressor stage;

driving the compressor stage with a compressor shaft connected to the drive shaft; and selecting speed of the compressor shaft to optimize or compensate for exhaust backpressure created by the metal catalytic converter.

18. The method as defined in claim 17 further comprising:

receiving exhaust gas from the engine through the catalytic converter with a first stage adjacent to the inlet fabricated from a transition metal adsorbing carbon monoxide (CO);

a second stage downstream from the first stage fabricated from a Noble metal reducing NOx and $CO_2$; and a third stage downstream from the second stage fabricated from a second Noble metal oxidizing excess hydrocarbons (HC).

19. The method as defined in claim 17 further comprising:

receiving exhaust gas from the engine through the catalytic converter with a first stage adjacent to the inlet fabricated from a transition metal adsorbing carbon monoxide (CO);

a second stage downstream from the first stage fabricated from a first Noble metal reducing NOx and $CO_2$;

a third stage downstream from the second stage fabricated from a second Noble metal oxidizing excess hydrocarbons (HC);

a fourth stage downstream from the third stage fabricated from the first Noble metal further reducing NOx and $CO_2$; and a fifth stage downstream of the fourth stage fabricated from the transition metal further adsorbing CO.

20. The method as defined in claim 19 wherein the transition metal is Tungsten, the first Noble metal is Rhodium and the second Noble metal is Palladium.

21. The method as defined in claim 19 wherein the first and second Noble metals are supplemented with platinum.

* * * * *